(12) United States Patent
Chen

(10) Patent No.: US 11,924,401 B2
(45) Date of Patent: Mar. 5, 2024

(54) SYSTEM AND METHOD FOR DISPLAYING A 3D IMAGE WITH DEPTHS

(71) Applicant: HES IP HOLDINGS, LLC, Spring, TX (US)

(72) Inventor: Tai Kuo Chen, New Taipei (CN)

(73) Assignee: HES IP HOLDINGS, LLC, Spring, TX (US)

(*) Notice: Subject to any disclaimer, the term of this patent is extended or adjusted under 35 U.S.C. 154(b) by 416 days.

(21) Appl. No.: 17/289,238

(22) PCT Filed: Oct. 29, 2019

(86) PCT No.: PCT/CN2019/114089
§ 371 (c)(1),
(2) Date: Apr. 28, 2021

(87) PCT Pub. No.: WO2020/088468
PCT Pub. Date: May 7, 2020

(65) Prior Publication Data
US 2022/0014727 A1    Jan. 13, 2022

(30) Foreign Application Priority Data

Oct. 29, 2018 (WO) ................ PCT/CN2018/112305

(51) Int. Cl.
*H04N 13/365* (2018.01)
*H04N 13/32* (2018.01)
*H04N 13/363* (2018.01)

(52) U.S. Cl.
CPC .......... *H04N 13/365* (2018.05); *H04N 13/32* (2018.05); *H04N 13/363* (2018.05)

(58) Field of Classification Search
CPC .... H04N 13/365; H04N 13/32; H04N 13/363; H04N 13/344; H04N 13/354;
(Continued)

(56) References Cited

U.S. PATENT DOCUMENTS

| 7,261,422 B2 | 8/2007 | Lin |
| 9,191,660 B2 | 11/2015 | Wang |

(Continued)

FOREIGN PATENT DOCUMENTS

| CN | 1800963 A | 7/2006 |
| CN | 103913940 A | 7/2014 |

(Continued)

OTHER PUBLICATIONS

International Search Report and Written Opinion dated Feb. 5, 2020 in International Patent Application No. PCT/CN2019/114089, filed on Oct. 29, 2019.

(Continued)

*Primary Examiner* — Magda Cruz
(74) *Attorney, Agent, or Firm* — Chen Yoshimura LLP

(57) ABSTRACT

A system and method for displaying a 3D image with depths, which utilize at least one light signal generator to sequentially generate multiple light signals(S100) and at least one optical assembly to receive the multiple light signals from the at least one light signal generator, and project and scan the multiple light signals within a predetermined time period to display the 3D image in space(S200). Each pixel of the 3D image is displayed at a position by at least two of the multiple light signals to a viewer's eye, paths or extensions of the paths of the at least two light signals intersects at the position and at an angle associated with a depth of the pixel, and the predetermined time period is one eighteenth of a second. Accordingly, the advantages of simplified structure, a miniatured size, and a less costly building cost can be ensured.

29 Claims, 20 Drawing Sheets

(58) Field of Classification Search
CPC ...... H04N 13/39; H04N 9/3129; G02B 30/33; G02B 26/101; G02B 30/24; G03B 21/2033
See application file for complete search history.

(56) References Cited

U.S. PATENT DOCUMENTS

| | | | |
|---|---|---|---|
| 2002/0139920 A1 | 10/2002 | Seibel et al. | |
| 2013/0070052 A1 | 3/2013 | Yamashita et al. | |
| 2014/0085436 A1 | 3/2014 | Page et al. | |
| 2014/0285429 A1 | 9/2014 | Simmons | |
| 2015/0054927 A1 | 2/2015 | Chen et al. | |
| 2015/0338658 A1* | 11/2015 | Davis | G02B 27/0172 345/8 |
| 2017/0188021 A1* | 6/2017 | Lo | H04N 13/322 |
| 2018/0059618 A1 | 3/2018 | Niu | |
| 2018/0255278 A1 | 9/2018 | Tardif et al. | |
| 2021/0011431 A1* | 1/2021 | Takashima | H04N 9/3164 |

FOREIGN PATENT DOCUMENTS

| | | |
|---|---|---|
| CN | 105607454 A | 5/2016 |
| CN | 108663874 A | 10/2018 |
| WO | 2020087195 A1 | 5/2020 |

OTHER PUBLICATIONS

International Search Report and Written Opinion dated Jul. 25, 2019 in International Patent Application No. PCT/CN2018/112305, filed on Oct. 29, 2018.
EP 19878384.7 European search report dated May 23, 2022.
Sudo T et al: "3D Display Using Intersection of Light Beams" Proceedings of Spie, IEEE, US, vol. 3957, Jan. 24, 2000, pp. 215-224, XP008021931, DOI:10.1117/12.384445 ISBN:978-1-62841-730-2 p. 216-p. 218.
EP 19878384.7 European Search Report, dated Nov. 29, 2023.

* cited by examiner

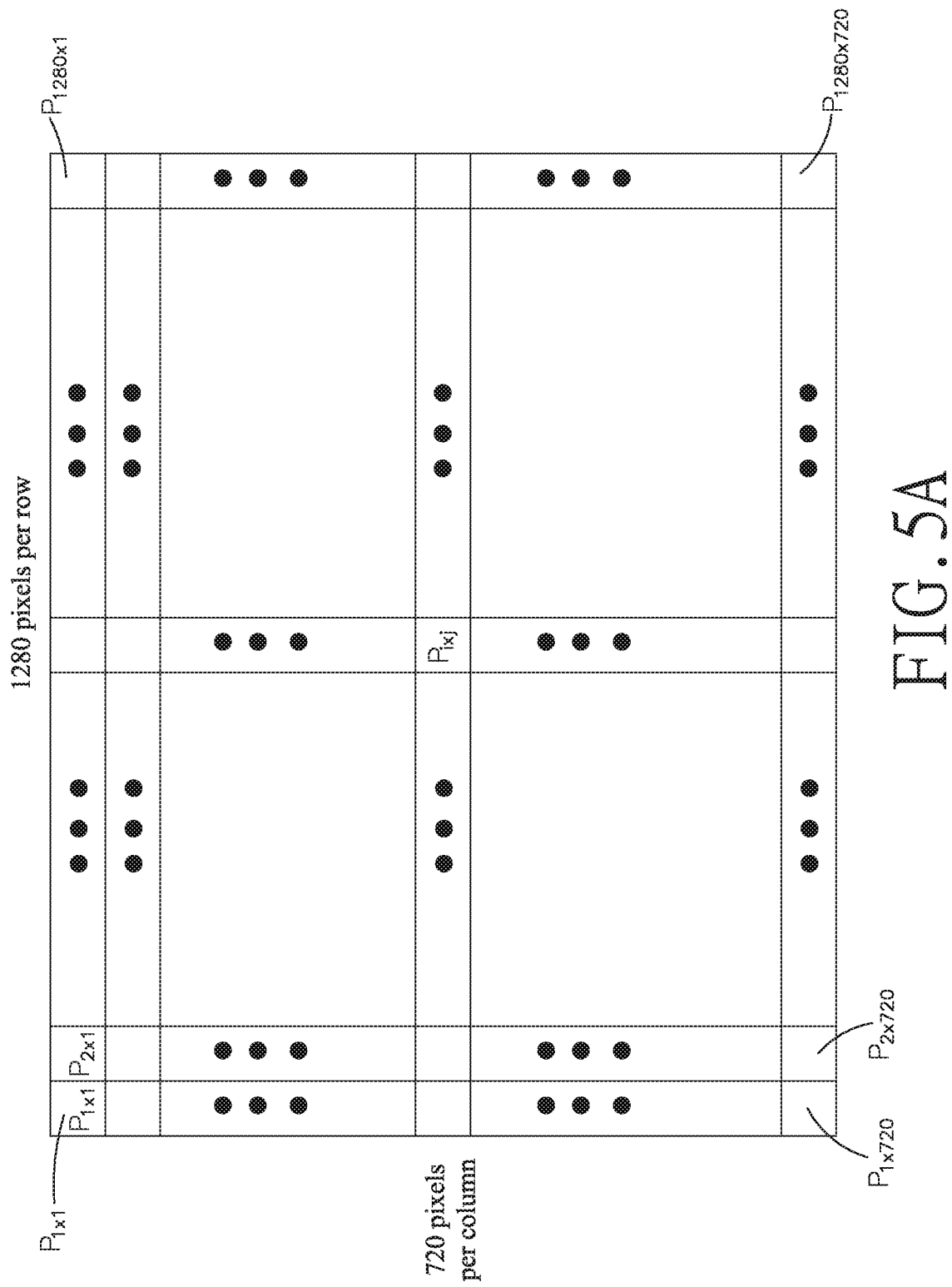

| LOOKUP TABLE | | |
| --- | --- | --- |
| Depth of Field | $\theta_1$ | $\theta_2$ |
| 146mm | 70 | 76 |
| 148mm | 68 | 73 |
| 150mm | 67 | 72 |
| ... | ... | ... |

FIG. 7

SYSTEM AND METHOD FOR DISPLAYING A 3D IMAGE WITH DEPTHS

RELATED APPLICATION

This application claims the benefit of PCT application PCT/CN2018/112305, filed on Oct. 29, 2018, titled "SYSTEM AND METHOD FOR DIAPAYING A HOLOGRAPHIC IMAGE", incorporated herein by reference.

BACKGROUND OF THE INVENTION

Field of the Invention

The present disclosure relates generally to a method and a system for displaying stereoscopic images and, in particular, to a method and a system for displaying stereoscopic images with each pixel thereof displayed at a position intersected by the paths or the extension of the paths of at least two light signals sequentially generated.

Description of Related Art

Autostereoscopy is the technique of displaying stereoscopic images without requiring any headgear or spectacle worn on the viewer and is thus called "glasses-free 3D." Attributable to the technique of autostereoscopic 3D displays, wearing special viewing glasses or tracking devices is no longer a pre-requisite to enjoy naked-eye 3D visulization. However, their limitations, such as narrow viewing angle, low image quality, crosstalk, and shallow image depth, prevent their further promotion in a larger area of naked-eye 3D visualization and wider commercial use. Regardless, there are many approaches developed to deliver autostereoscopic display, one of which is 3D holography and volumetric display.

3D hologram is three-dimensional image generated using photographic projection. It is truly 3D and free-standing image which does not simulate spatial depth and does not require special glasses to view. In other words, it is defined as 3D projection which exists freely in the space. It is holographic recording of light field rather than image formed by lens. However, 3D holography has the following drawbacks: (1) it is not easily seen in the presence of fluorescent lighting; (2) implementations of holographic projection in the design of products are costly; (3) it is time consuming to construct images using 3D holograms; (4) holographic data storage suffers from noise and sensitivity issues. Thus, it has material limitations. Meanwhile, it is not easy to achieve rapid progress for commercial use in a short period due to various factors, such as dynamic display, real-time generation, and electronic signal transfer for TV presence.

Other conventional technique involved with autostereoscopic display may adopt micro electromechanical system (MEMS) mirror to display 3D image by reflecting and projecting light rays onto corresponding positions in space. However, such conventional technique requires a MEMS mirror array formed by many MEMS mirrors to display a high-resolution 3D image, thereby making the resulting 3D image display system bulky and costly and not feasible to practical stereoscopic image display applications.

SUMMARY

An object of the present disclosure is to provide a system and a method for displaying a 3D image with depths, which are characterized by the use of MEMS mirrors to reflect sequentially generated light signals so that their paths of the extension of their paths intersect at a position to form a corresponding pixel of the 3D image in space according to the depth of the pixel.

Additional features and advantages of the disclosure will be set forth in the descriptions that follow, and in part will be apparent from the descriptions, or may be learned by practice of the disclosure. The objectives and other advantages of the disclosure will be realized and attained by the structure and method particularly pointed out in the written description and claims thereof as well as the appended drawings.

To achieve the foregoing objective, the system for displaying a 3D image with depths includes at least one light signal generator and at least one optical assembly. The at least one light signal generator sequentially generates multiple light signals. The at least one optical assembly receives the corresponding multiple light signals from the at least one light signal generator, and projects and scans the multiple light signals within a predetermined time period based on a predetermined scanning pattern to display the 3D image in space. Each pixel of the 3D image is displayed at a position by at least two of the multiple light signals to a viewer's eye. Paths or extensions of the paths of the at least two light signals intersects at the position and at an angle associated with a depth of the pixel, and the predetermined time period is one eighteenth of a second.

To achieve the foregoing objective, the method for displaying a 3D image with depths includes: (a) at least one light signal generator sequentially generating multiple light signals; and (b) at least one optical assembly receiving the multiple light signals, and projecting and scanning the multiple light signals within a predetermined time period based on a predetermined scanning pattern to display the 3D image in space. Each pixel of the 3D image is displayed at a position by at least two of the multiple light signals to a viewer's eye. Paths or extensions of the paths of the at least two light signals intersect at the position and at an angle associated with a depth of the pixel, and the predetermined time period is one eighteenth of a second.

From the foregoing description, it can be seen that at least two of the multiple light signals sequentially generated at different time are reflected and projected to a position in space to display a corresponding pixel of the 3D image to a viewer's eye. Paths or extensions of the paths of the at least two sequentially generated light signals intersect to display the pixel at the location of intersection. In view of persistence of human vision, all light signals displaying a 3D image received by a viewer's eye within one eighteenth of a second is perceived as a 3D image with depths by the viewer's eye. Accordingly, the method and the system of the present invention bring forth the advantages of simplified structure and miniatured size at a less costly building cost.

It is to be understood that both the foregoing general description and the following detailed description are exemplary and explanatory and are intended to provide further explanation of the invention as claimed.

BRIEF DESCRIPTION OF THE DRAWINGS

FIGS. 5A to 5C are schematic diagrams showing pixels formed by light signals generated through different sequences in accordance with the present invention.

FIG. 7 is a graph showing a lookup table in accordance with the present invention.

DETAILED DESCRIPTION OF PREFERRED EMBODIMENTS

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The described embodiments concern one or more methods, systems, apparatuses, and computer readable mediums storing processor-executable process steps to display a 3D image with depths in space for a viewer's eye. A 3D image projecting system has at least one light signal generator and at least one corresponding optical assembly. Each light signal generator has a corresponding optical assembly. Each light signal generator sequentially generates multiple light signals that are irradiating to a corresponding optical assembly. The optical assembly projects and scans the multiple light signals from the light signal generator to display the 3D image in space. Each light signal is projected to a position with a depth in space. The viewer can see the 3D image with depths because all light signals enter the viewer's eye within the time period of persistence of vision. Each pixel is displayed at a position by at least two light signals whose paths or extensions of the paths intersect at the position and at an angle associated with the depth of the pixel. The light signals are sequentially generated by the light signal generator and each light signal is very short in time. As a result, the at least two light signals projecting a pixel may not physically intersect with each other at the position the pixel is displayed. However, the viewer would perceive the pixel being displayed at the position due to the persistence of vision.

Figure 1:
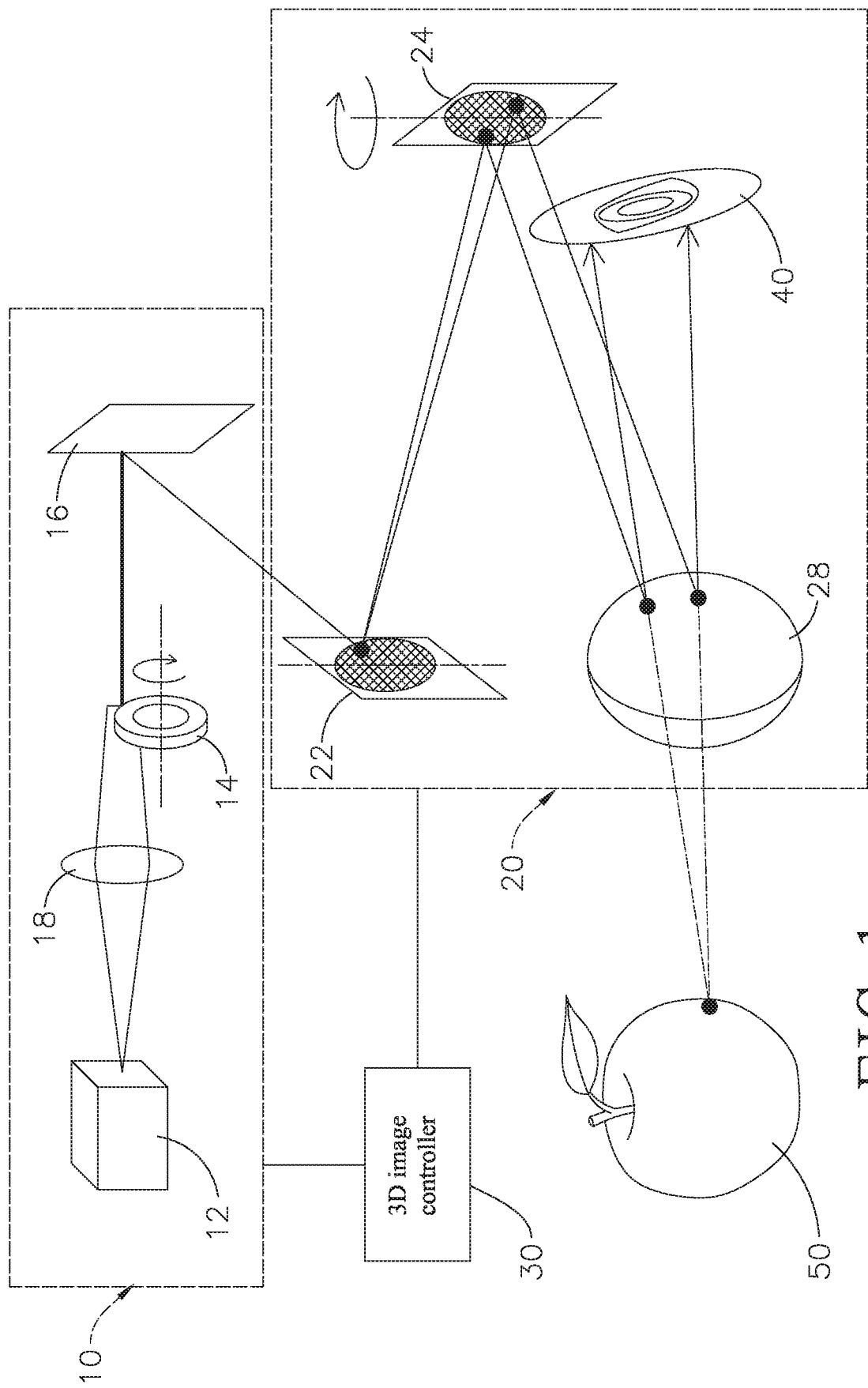
FIG. 1 is a schematic diagram illustrating a first embodiment of a system for displaying a 3D image with depths in accordance with the present invention.

In first embodiment, as shown in FIG. 1, a 3D image projecting system comprises a light signal generator 10 for sequentially generating multiple light signals irradiating onto an optical assembly 20. The light signal generator 10 further comprises a light source 12, a light color modifier 14, and a reflector 16. The light source 12 may be laser, light emitting diode ("LED"), micro light emitting diode ("Micro LED"), organic light emitting diode ("OLED"), or superluminescent diode ("SLD"), or any combination thereof. The light color modifier 14 may be a color filter or a combiner depending on the light source 12. In this embodiment, the light source 12 may be a white light SLD or a white light LED. In this situation, the light color modifier 14 may be a color filter to derive the desired pixel light color. In another embodiment, the light source 12 may include a red color light laser, a green color light laser, and a blue color light laser. In that situation, the light color modifier 14 may be a combiner such as Dichroic combiner and Polarizing combiner. The reflector 16 may be used to adjust the direction of the multiple light signals. The reflector 16 may be an adjustable reflector or a fixed reflector. If an adjustable reflector, the reflector 16 is a MEMS mirror. In the case of a MEMS mirror, the MEMES mirror needs to be set up to reflect the light signals in a fixed direction. In addition, the light signal generator 10 may include a light intensity modifier to derive the desired pixel light intensity. The light signal generator 10 may further include a collimator 18 to narrow the light beam of the multiple light signals, for example to cause the directions of motion to become more aligned in a specific direction or to cause spatial cross section of the light beam to become smaller. The collimator 18 may be a curved mirror or lens.

The time duration of one light signal is short, for example about 31 nanosecond. In one embodiment, the resolution of a 3D image is 1280×720 pixels per frame. At least two light signals are required to display a pixel in a position. For the viewer to see such a 3D image, the light signal generator 10 has to sequentially generate 1280×720×2 light signals within the time period of persistence of vision, for example 1/18 second. Thus, the time duration of each light signal is about 30.14 nanosecond. To display 3D animated images in space smoother, 24 or more frames are projected per second. That is to say, each frame with 1280×720 pixels has to be projected within 1/24 second or shorter time period, rather than 1/18 second. Thus, to display 24 frames per second, the time duration of each pixel has to be 22.61 nanosecond. Since each light signal is sequentially generated by the light signal generator 10 and the time duration of each pixel is less than 30.14 nanosecond, the two light signals projecting a same pixel do not propagate through the position where their paths or extensions of the paths intersect instead.

Figure 2:
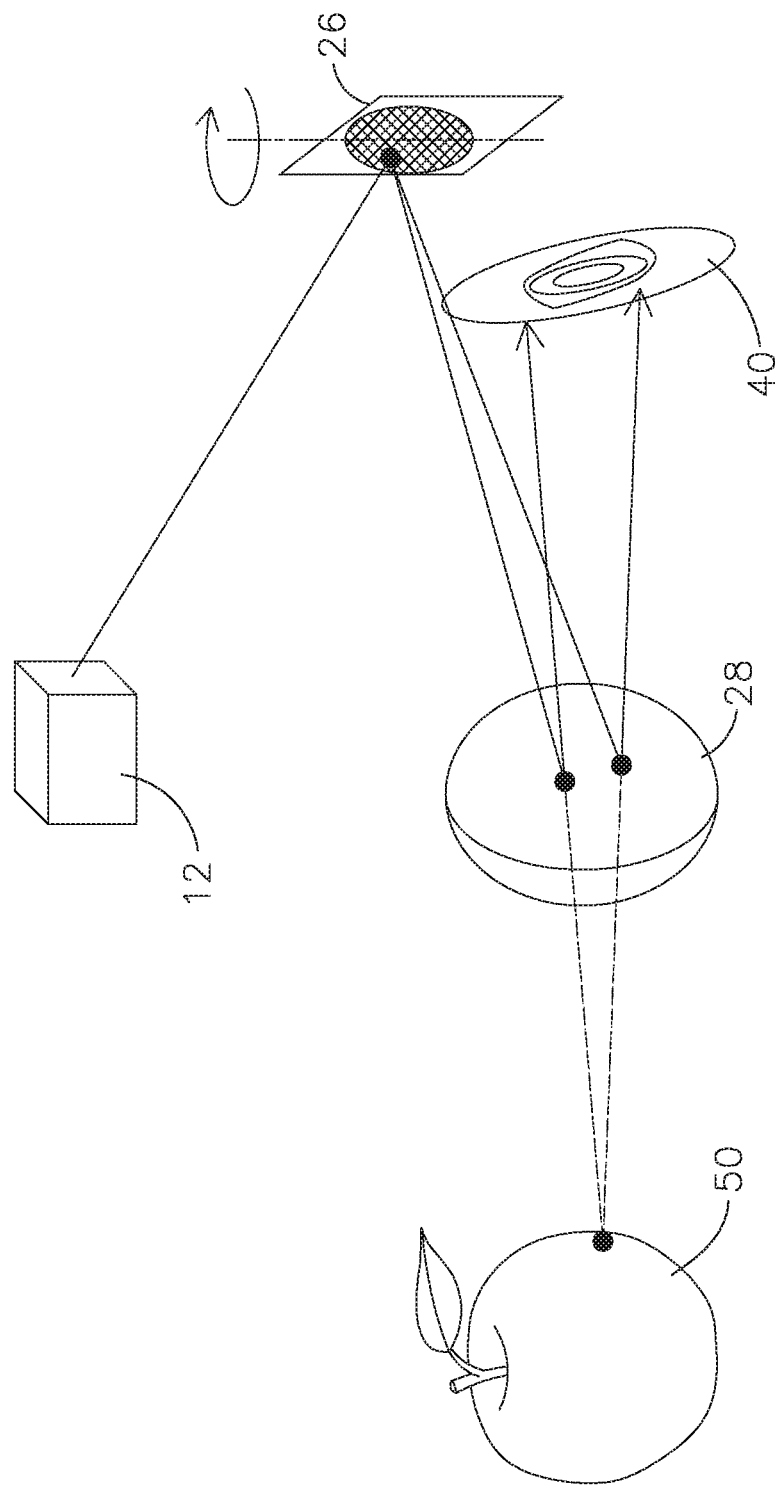
FIG. 2 is a schematic diagram illustrating a second embodiment of a system for displaying a 3D image with depth in accordance with the present invention.

The optical assembly 20 is used to project the multiple light signals from the light signal generator 10 to propagate along their specific light paths so that each pixel of the 3D image is displayed at its desired position and depth to the viewer's eye 40. Thus, the optical assembly 20 may comprise one or more adjustable reflectors, each of which may comprise one or more lens or mirrors that can reflect light signals and adjust their reflecting angles in a 2D or 3D manner. Each adjustable reflector may be electromechanical system ("MEMS") mirror, liquid crystal on silicon ("LCOS"), or digital light processing ("DLP"), or any combination thereof. In this embodiment shown in FIG. 1, the optical assembly 20 may comprise two 2D-adjustable reflectors—a first 2D-adjustable reflector 22 and a second 2D-adjustable reflector 24. The first 2D-adjustable reflector 22 may be implemented by a first biaxial MEMS mirror and the second 2D-adjustable reflector 24 may be implemented by a second biaxial MEMS mirror. In another embodiment as shown in FIG. 2, the optical assembly 20 may comprise a 3D-adjustable reflector 26 which can rotate and/or move in 3 dimensions to adjust the reflecting angle of each light signal. The 3D-adjustable reflector 26 may be implemented by a triaxial MEMS mirror. In addition, the optical assembly 20 in FIGS. 1 and 2 may further comprise a fixed reflector 28 to facilitate alignment of the multiple light signals so that the viewer can see the 3D image easier. The fixed reflector 28 may comprise flat mirror, Fresnel lens, Fresnel reflector, curved mirror, diopter lens, periodic nanostructure photopolymer film, or Bragg grating waveguide, or any combination thereof. In particular, in the application of augmented reality ("AR"), the fixed reflector 28 may be a lens of an AR glasses.

Figure 3:
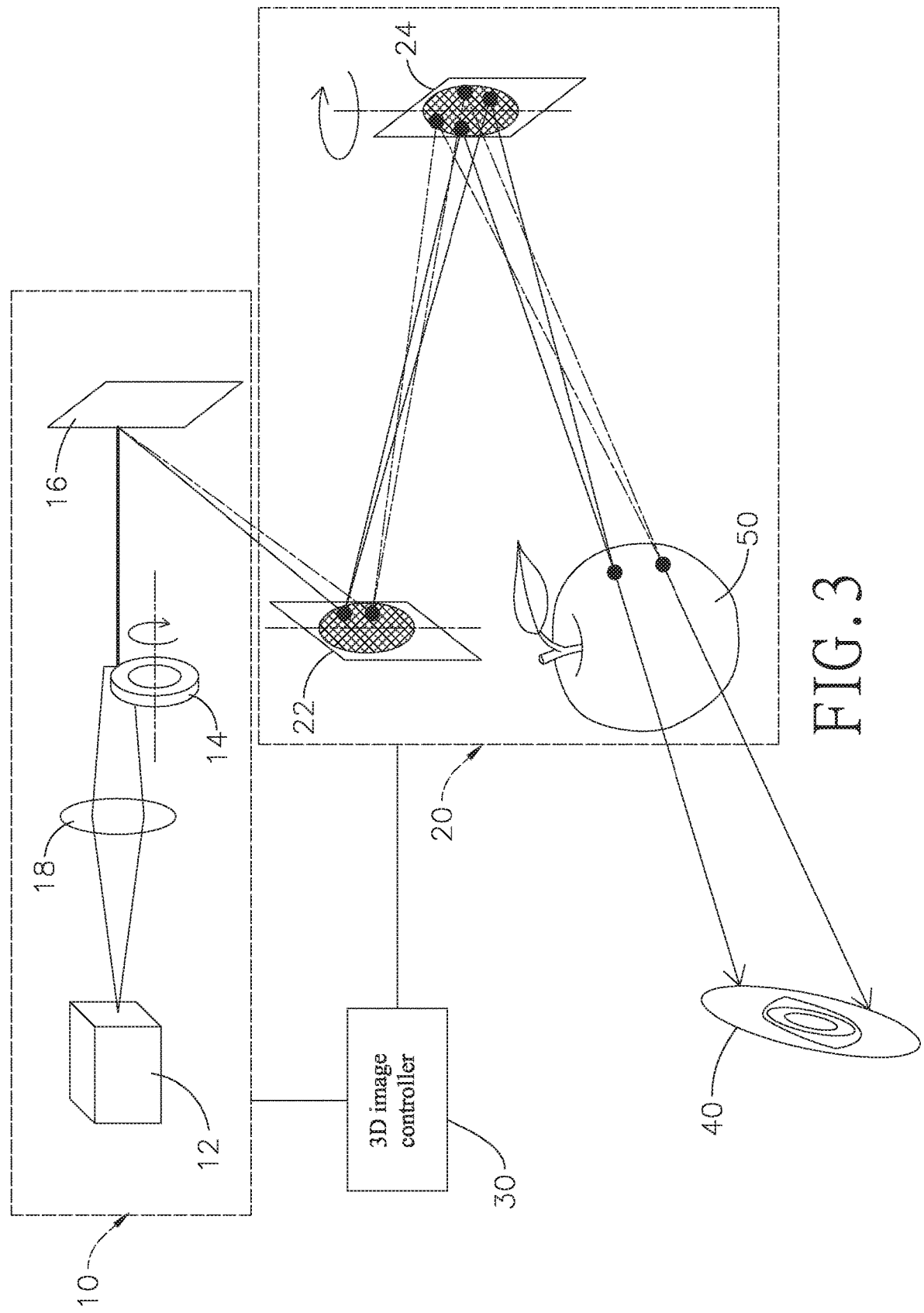
FIG. 3 is a schematic diagram illustrating a third embodiment of a system for displaying a 3D image with depth in accordance with the present invention.

As shown in FIGS. 2 and 3, the optical assembly 20 can contain only one or more adjustable reflectors with the fixed reflector 28 being optional. The optical assembly 20 may include (1) the two 2D-adjustable reflectors which may be implemented by the first biaxial MEMS mirror 22 and the second biaxial MEMS mirror 24 or (2) the one 3D-adjustable reflector which may be implemented by the triaxial MEMS mirror 26. When the fixed reflector 28 is absent, the viewer can see the light signals actually projecting the 3D image in space. In other words, after propagating through the light path intersection, the at least two light signals projecting a pixel are directly received by the viewer's eye 40 without any further reflection.

Figure 4:
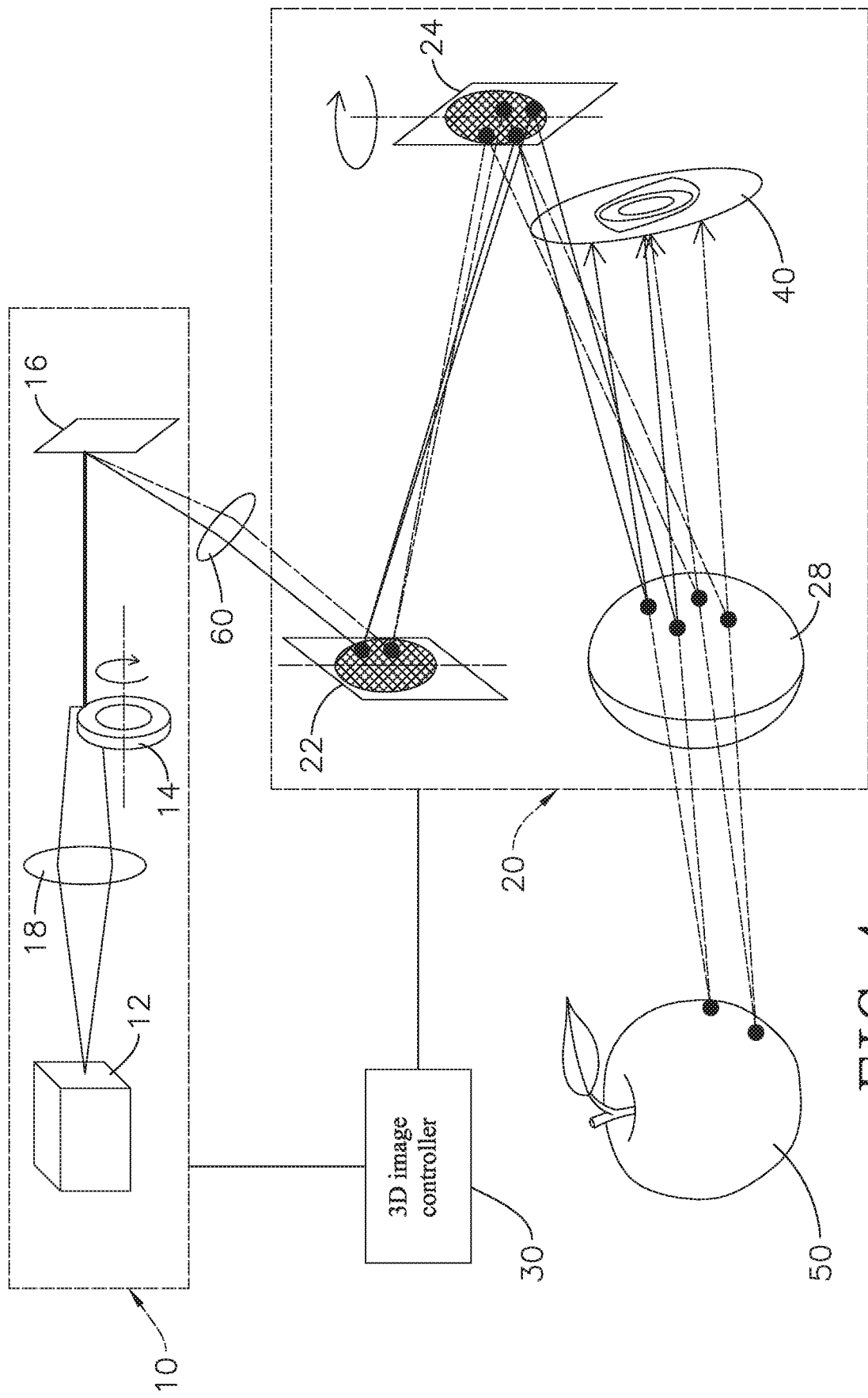
FIG. 4 is a schematic diagram illustrating a fourth embodiment of a system for displaying a 3D image with depth in accordance with the present invention.

As shown in FIG. 4, at least one collimator 60 may be placed between the light signal generator 10 and the optical assembly 20 to narrow the light beam coming from the reflector 16. The collimator 60 can be a curved mirror or lens.

A 3D image controller 30 in FIG. 1 is connected to a 3D image creator (not shown) to receive multiple pixel data of the 3D image 50 and a predetermined scanning pattern from a 3D image creator. The producer of 3D image contents may use the 3D image creator to create a 3D image projection file which includes the multiple pixel data of the 3D image to be projected in space and the predetermined scanning pattern to scan such 3D image. A pixel data comprises information about one pixel which may include a pixel light color, a pixel light intensity, a pixel location, a pixel depth, and a pixel generation frequency of such pixel. In one example, the pixel light color may be represented by 24-bit color (8 bits in R, G, B respectively). In one example, a pixel light intensity may be represented by 8-bit scale controlled by current. In one example, the pixel location may be represented by a 2D or 3D coordinate. In one example, the pixel depth may be represented by a distance between the pixel and the viewer's eye 40. In one example, the pixel generation frequency may be represented by a number of pixels projected within one second.

The 3D image controller 30 may comprise at least one processor such as graphic processing unit, memory, input/output component, wireless or wired communication component, such as WiFi, bluetooth, 4G/5G telecommunication, and memory. Based on the multiple pixel data of the 3D image 50 and a predetermined scanning pattern received from the 3D image creator, the 3D image controller 30 generates light signal generator control signals for the light signal generator 10 and optical assembly control signals for the optical assembly 20. The light signal generator control signals may include signals to control various components of the light signal generator 10, such as light source 12, light color modifier 14, light intensity modifier 15, and the fixed reflector 16. In one embodiment, the light signal generator control signals are used to control the light source 12 and the light color modifier 14 to take turn to extract R, G, B color in generation of desired mixed color. The optical assembly control signal may include signals to control various components of the optical assembly 20, such as the rotation angels of the first biaxial MEMS mirror 22 and the rotation angles of the second biaxial MEMS mirror 24 for each pixel of the 3D image 50. The 3D image controller 30 transmits, by wireless or wired connection, the light signal generator control signals to the light signal generator 10, and the optical assembly control signal to the optical assembly 20. As a result, the at least two light signals with the desired color and intensity can propagate along the desired light paths so that the light paths or extension of the paths intersect at the desired location and at the desired angle to derive the desired depth for the viewer's eye 40.

As shown in FIG. 5A, the 3D image has a resolution of 1280×720 pixels per frame. In one embodiment, each pixel is displayed by projecting two light signals whose paths or extensions of the paths intersect at a position where the pixel is displayed. $P_{1\times1}(1)$ represents the first light signal for projecting the first pixel at the (1,1) location of the image frame. $P_{1\times1}(2)$ represents the second light signal for projecting the first pixel at the (1,1) location of the image frame. $P_{1\times2}(1)$ represents the first light signal for projecting the second pixel at the (2,1) location of the image frame. $P_{1\times2}(2)$ represents the second light signal for projecting the second pixel at the (2,1) location of the image frame. $P_{ij}(1)$ represents the first light signal for projecting the Nth pixel at the (i,j) location of the image frame. $P_{ij}(2)$ represents the second light signal for projecting the Nth pixel at the (i,j) location of the image frame. $P_{1280\times720}(1)$ represents the first light signal for projecting the last pixel at the (1280,720) location of the image frame. $P_{1280\times720}(2)$ represents the second light signal for projecting the last pixel at the (1280,720) location of the image frame.

Figure 5B:
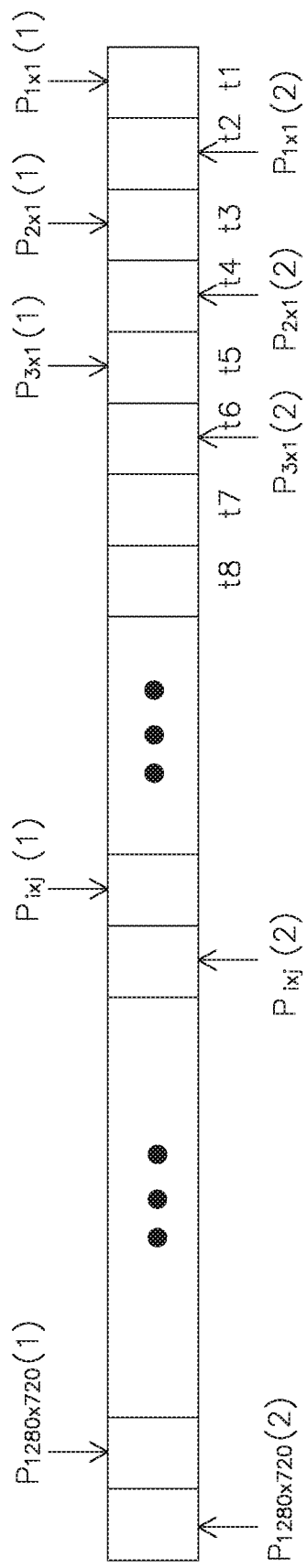

As shown in FIG. 5B, in one embodiment, the two light signals projecting a same pixel are sequentially and consecutively generated by the light signal generator 10. The multiple light signals are generated by the time sequence of t1 to t2 to t3 and to t(1280×720×2). $P_{1\times1}(1)$ representing the first light signal for projecting the first pixel at the (1,1) location of the image frame is generated at the time of t1 is followed by $P_{1\times1}(2)$ representing the second light signal for projecting the same first pixel at the (1,1) location of the image frame generated at the time of t2. If a left to right and top to down scanning pattern is used, the two light signals projecting the second pixel at the (2, 1) location of the image frame follow those for the first pixel. In details, $P_{2\times1}(1)$ representing the first light signal for projecting the second pixel at the (2,1) location of the image frame generated at the time of t3 is followed by $P_{2\times1}(2)$ representing the second light signal for projecting the same second pixel at the (2,1) location of the image frame generated at the time of t4.

Figure 5C:
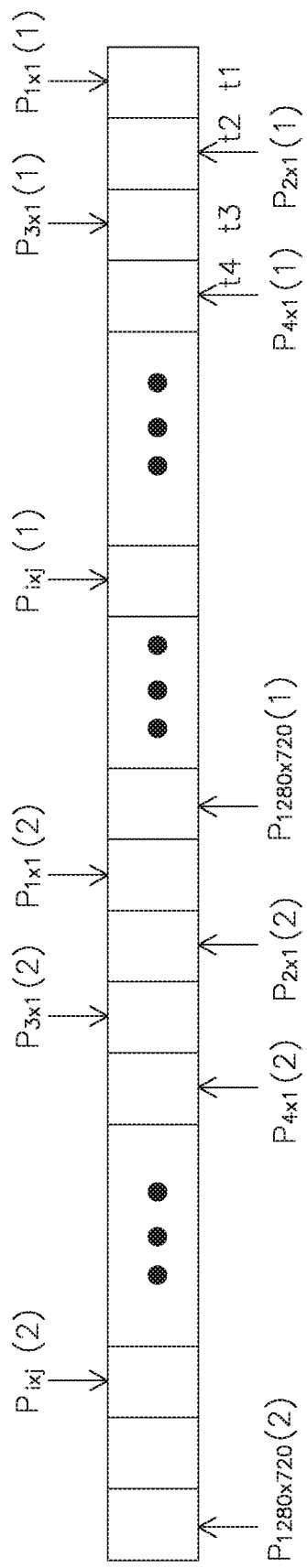

As shown in FIG. 5C, in another embodiment, the two light signals projecting a same pixel are sequentially and separately generated by the light signal generator 10. The multiple light signals are still generated at the time sequence from t1 to t2 to t3 and to t(1280×720×2). However, while the first light signal for $P_{1\times1}(1)$ representing the first light signal for projecting the first pixel at the (1,1) location of the image frame is generated at the time of t1, $P_{1\times1}(2)$ representing the second light signal for projecting the same first pixel at the (1,1) location of the image frame is generated at the time of t(1280×720+1). The first light signal and the second light signals for projecting the same pixel at the (1,1) location of the image frame are separated by 1280×720 of other light signals. In this embodiment, although the scanning pattern of left to right and top to down is also used, the first light signal for all pixels are generated first and then followed by the second light signal for all pixels.

Figure 6A:
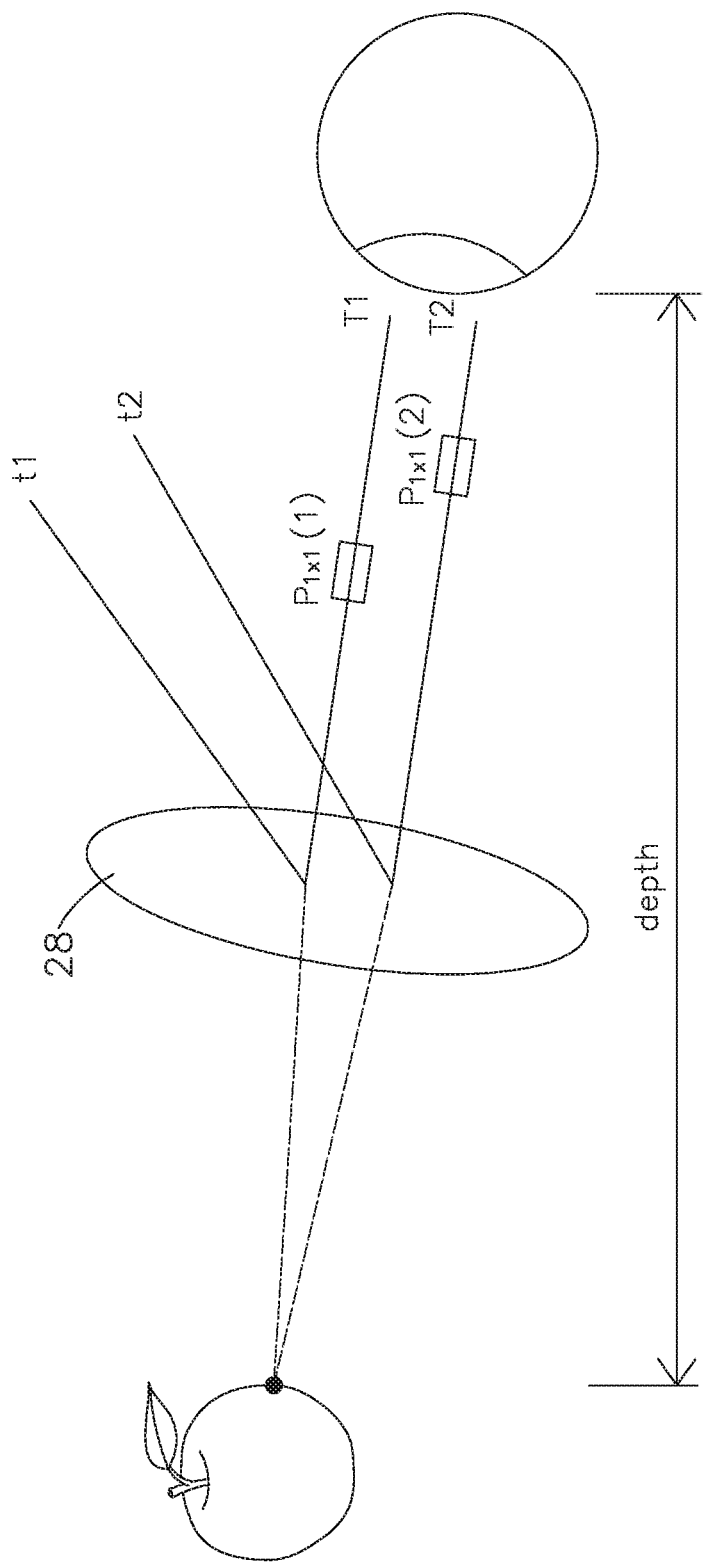
FIGS. 6A and 6B are schematic diagrams showing light signals with two and three colors displaying a same pixel in accordance with the present invention.

As shown in FIG. 6A, the first light signal $P_{1\times1}(1)$ and the second light signal $P_{1\times1}(2)$ for projecting the same first pixel are sequentially generated at the different time of t1 and t2 by the light signal generator 10, propagate along different light paths, and arrive at the viewer's eye at the different time of T1 and T2. The first light signal and the second light signal do not actually intersect with each other. However, their paths or the extensions of their paths to the viewer's eye intersect at a position where the first pixel is projected with a depth to the viewer. Each of the first light signal and the second light signal for projecting a same pixel may contain a mixed color of red, green, and blue and is identical in colorfulness. However, the first light signal and the second light signal for projecting a same pixel may have complementary light colors. For example, the first light signal has red color and the second light signal has cyan color; the first light signal has green color and the second light signal has magenta color; or the first light signal has blue color and the second light signal has yellow color.

Figure 6B:
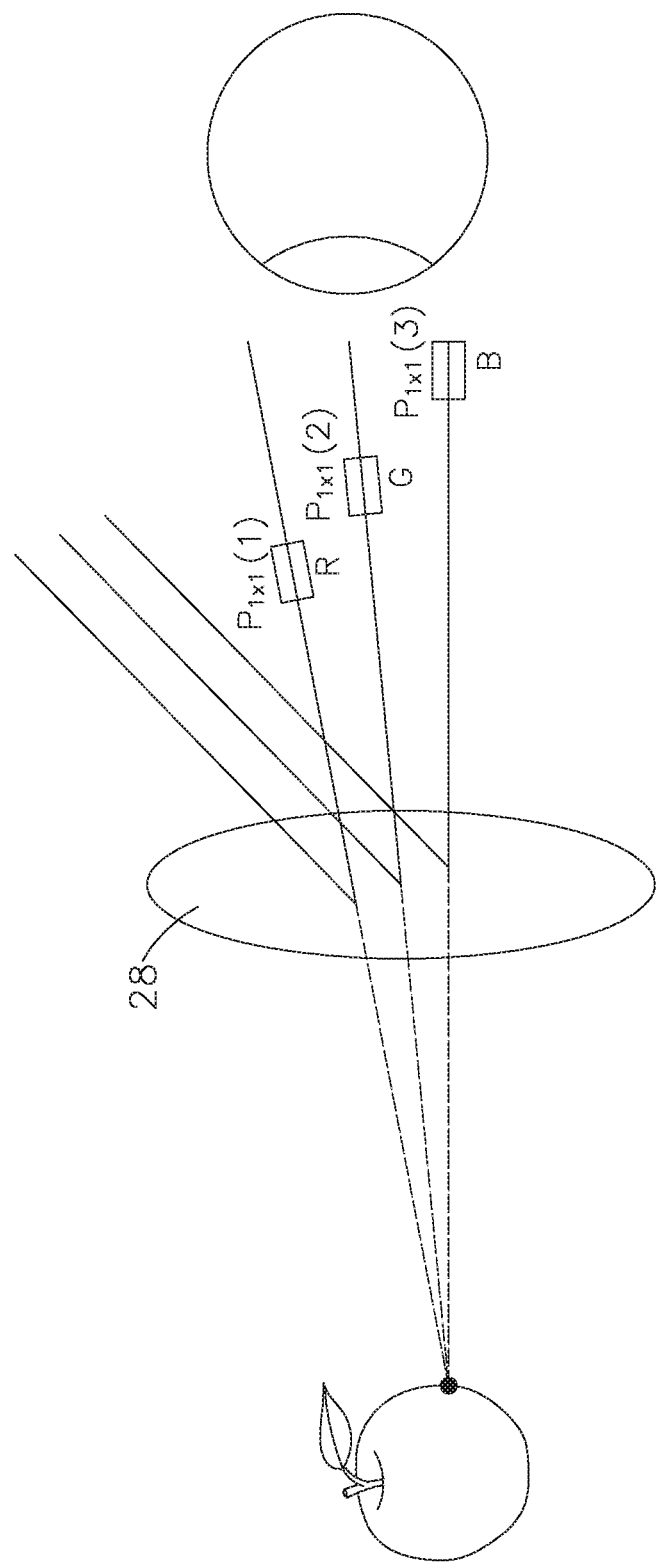

As shown in FIG. 6B, the first pixel at (1,1) location of the image frame is projected by three light signals—the first light signal $P_{1\times1}(1)$, the second light signal $P_{1\times1}(2)$, and the third light signal $P_{1\times1}(3)$. Each of the three light signals of the first pixel is respectively generated at a different time and also arrive at the viewer's eye at a different time. Thus, the first light signal, the second light signal, and the third light signal do not actually intersect with each other. However, their paths or extension of their paths to the viewer's eye intersect at a position where the first pixel is projected with a depth to the viewer. In this embodiment, the first light signal, the second light signal and the third light signal respectively have the red, green, and blue color.

Figure 8A:
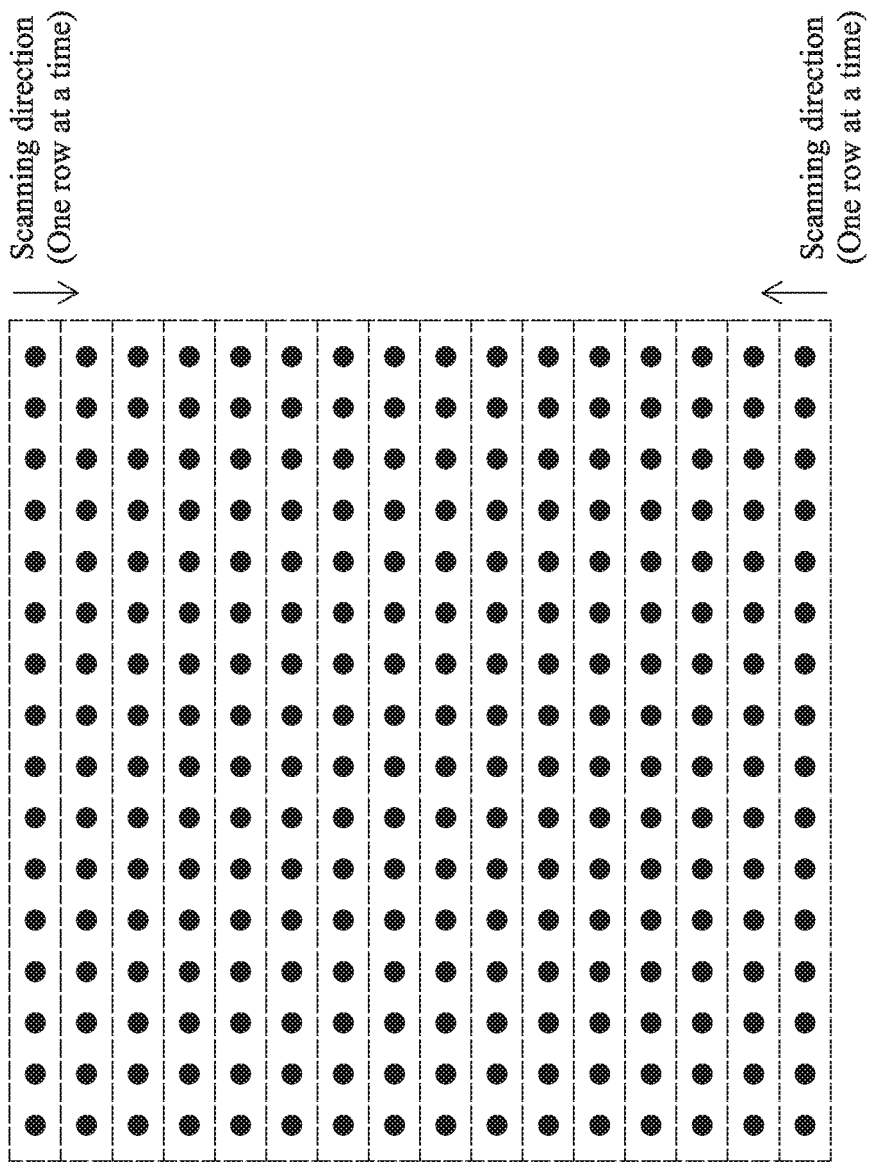
FIGS. 8A to 8F are schematic diagrams showing different scanning patterns in accordance with the present invention.
Figure 8B:
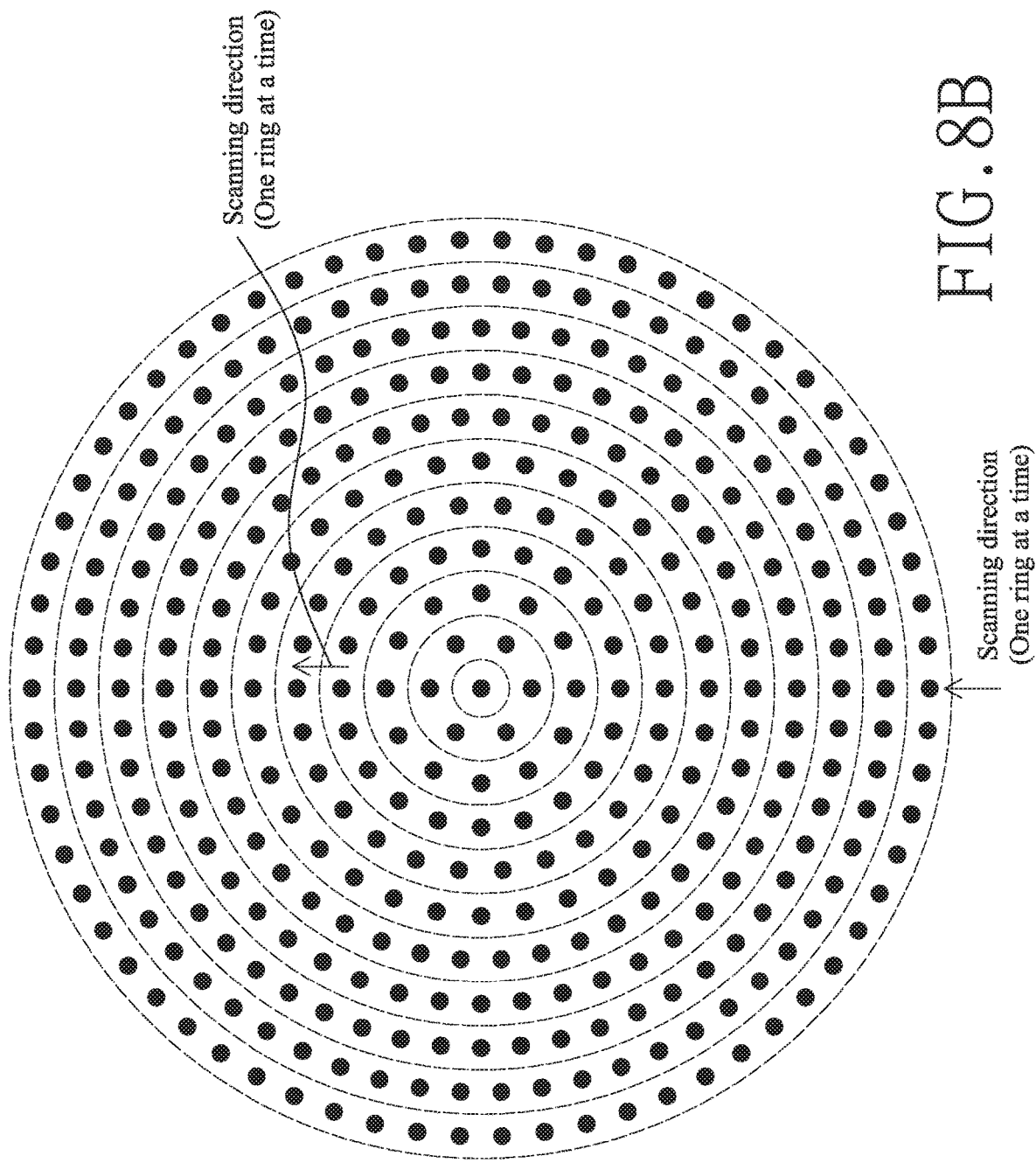
Figure 8C:
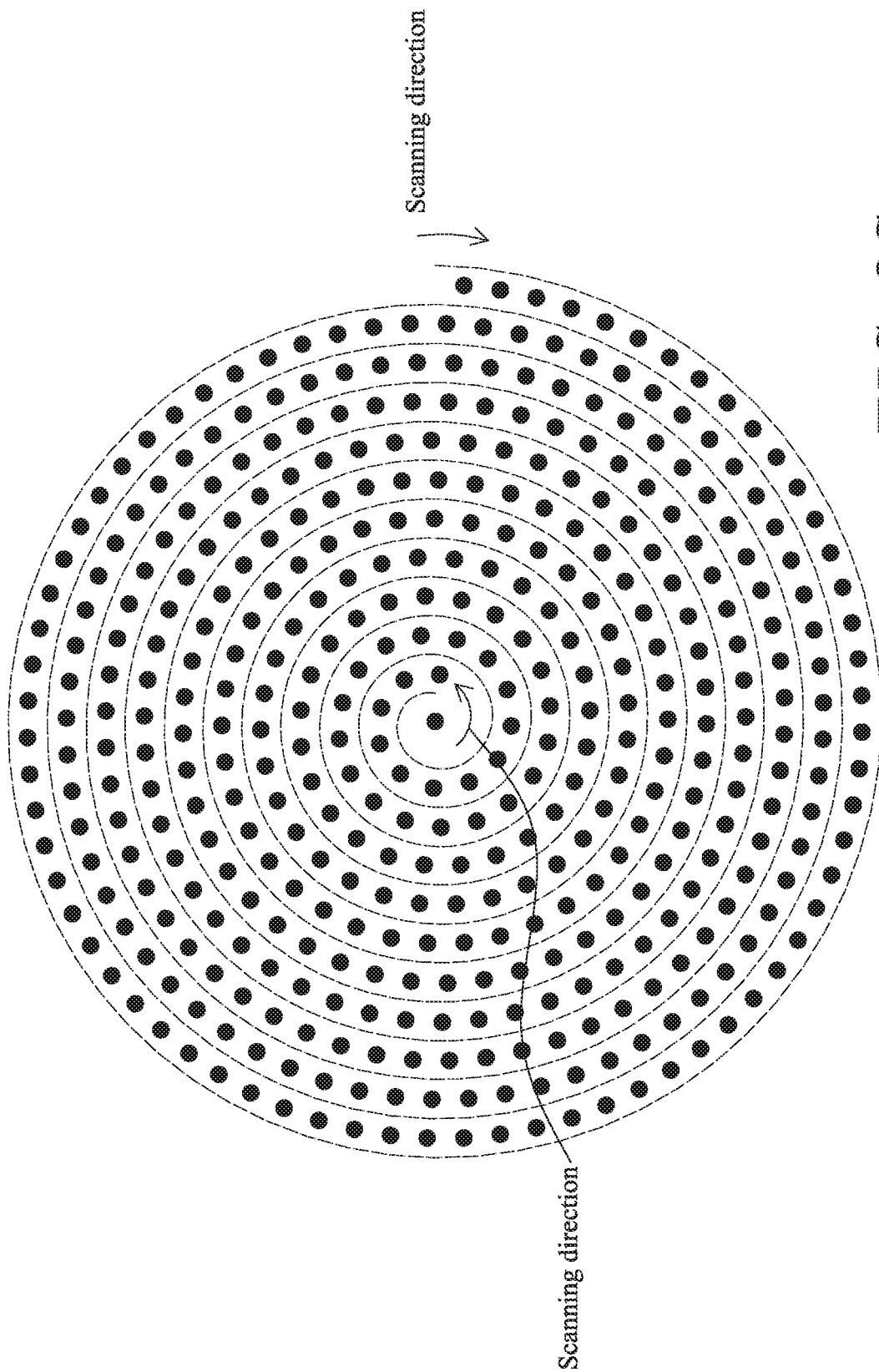
Figure 8D:
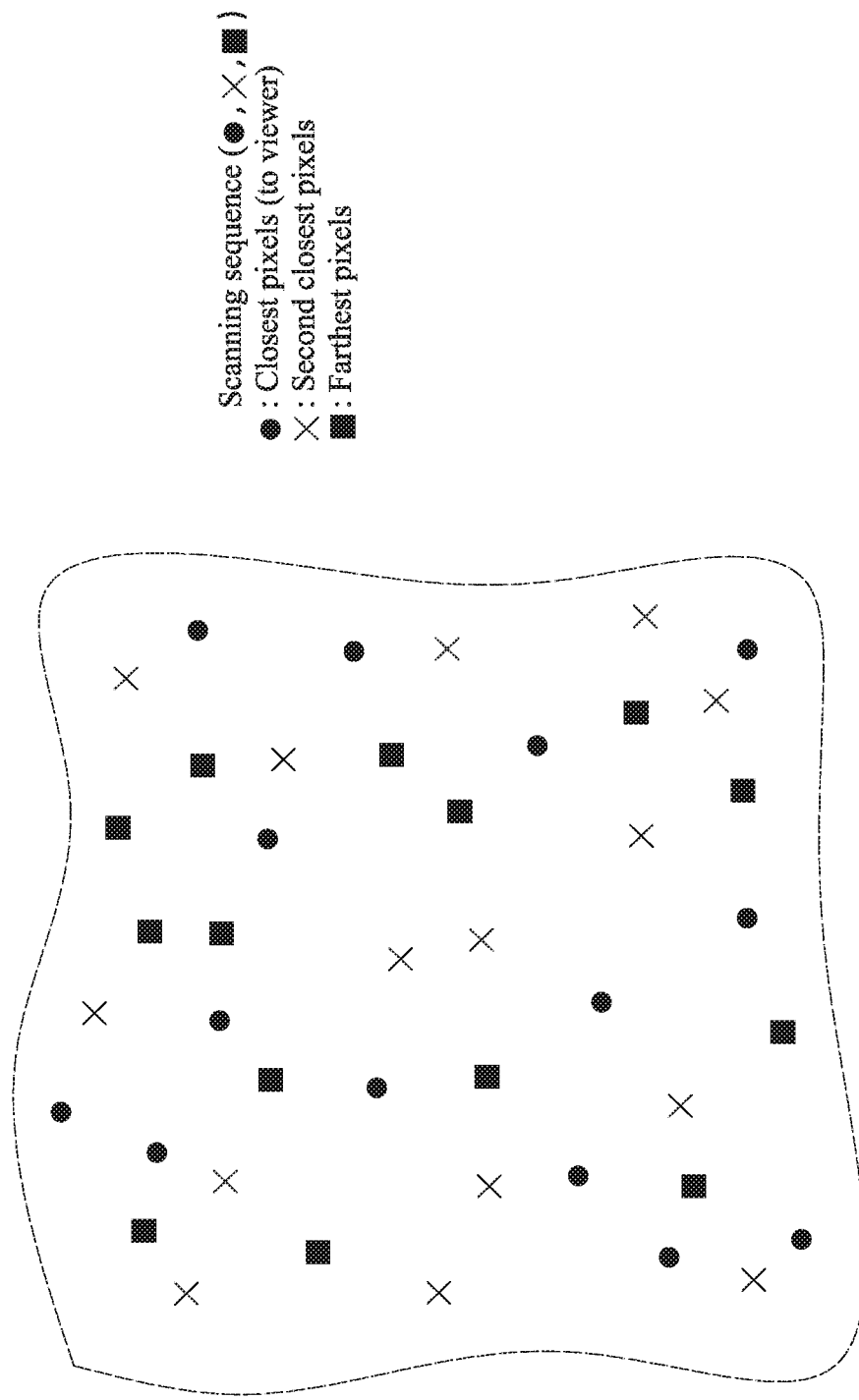
Figure 8E:
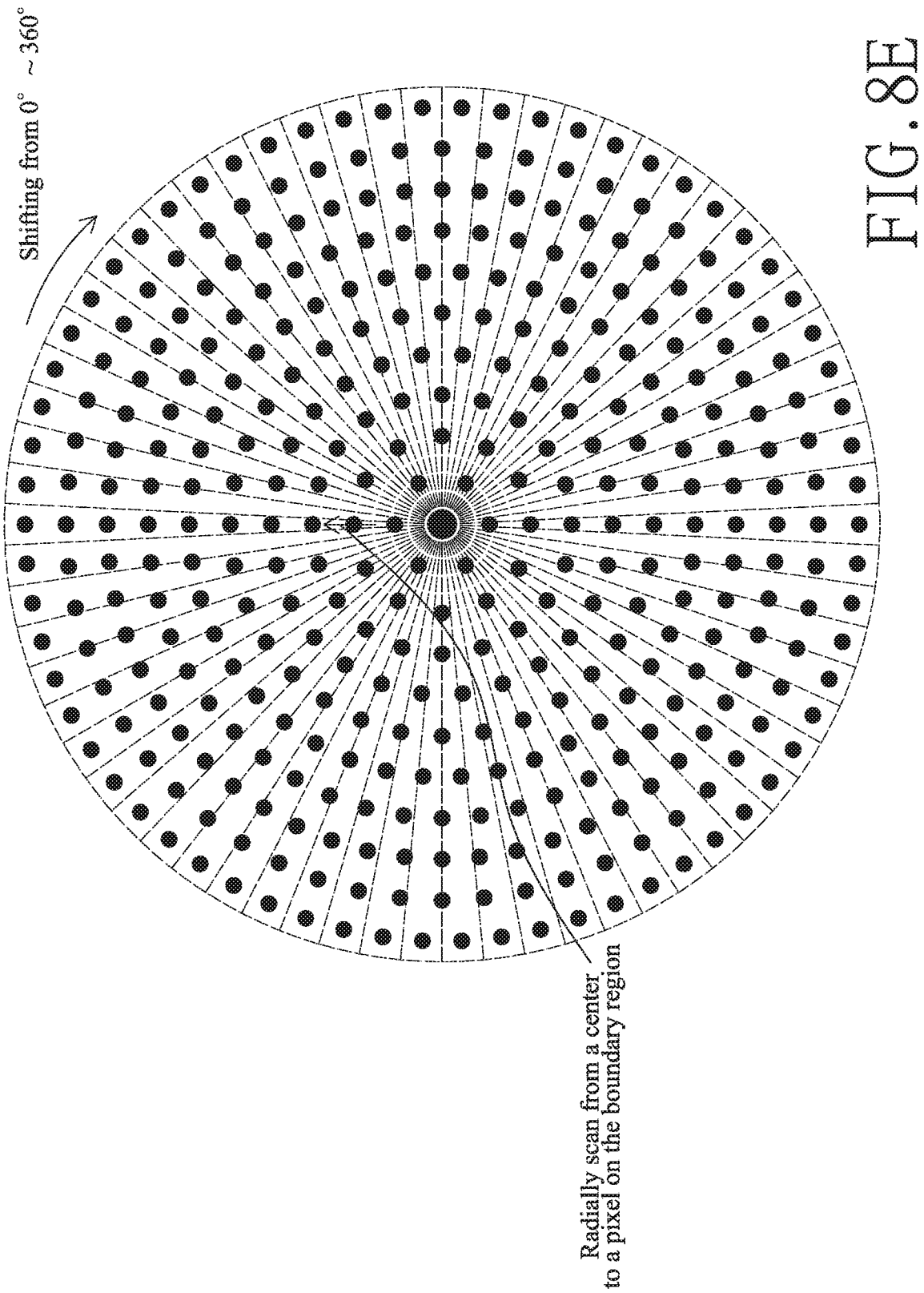
Figure 8F:
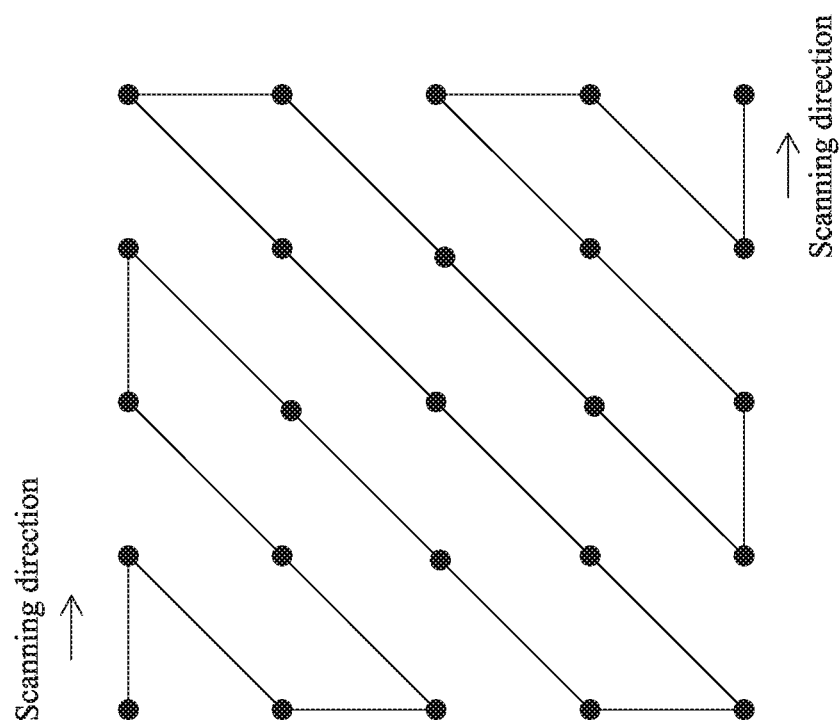

When the 3D image is displayed in a space, the sequence and the pattern associated with how the 3D image is displayed can be determined by a scanning pattern. With reference to FIGS. 8A to 8F, a couple of non-limiting examples are given for illustrating the scanning pattern. With reference to FIG. 8A, the scanning pattern is defined to scan one row of the 3D image at a time in a left-to-right and top-down direction or in a left-to-right and bottom-up direction. With reference to FIG. 8B, the scanning pattern is defined to scan the pixels concentrically located rings in the 3D image in a direction from an innermost ring to an outermost ring or from the outermost ring to the innermost ring. With reference to FIG. 8C, the scanning pattern is defined to scan the 3D image spirally from an end point on a boundary region to a center of the 3D image, or from the center to the end point on the boundary region. With reference to FIG. 8D, the scanning pattern is defined to scan the 3D image from the closest pixels (to viewer) to the farthest pixels, or from the farthest pixels to the closest pixels. As noted, the closest pixels are marked by the symbol '●', the second closest pixels are marked by the symbol 'x', and the farthest pixels are marked by the symbol '■'. With reference to FIG. 8E, the scanning pattern is defined to scan the 3D image radially through all pixels between a center and a pixel on a boundary region in a direction sequentially shifting from 0 degree to 360 degrees. With reference to FIG. 8F, the scanning pattern is defined to scan the 3D image in a zigzag manner traversing all pixels of the 3D image from a top left corner to a bottom right color.

The 3D image controller 30 receives the multiple pixel data of the 3D image and the predetermined scanning pattern from the 3D image creator, and then respectively provides light signal generating control data to the at least one light signal generator and provides optical assembly control data to the optical assembly. The light signal generator generates the multiple light signals based on the light signal generating control data, and the optical assembly projects and scans the multiple light signals based on the optical assembly control data. As shown in FIG. 7, the lookup table is used to provide a mapping scheme to map a same depth of two of the multiple light signals whose extensions intersect to form a pixel of the 3D image corresponding to the two light signals at an intersected position in space to the optical assembly control data, namely, two reflection angles $\theta_1$ and $\theta_2$, with which the second 2D-adjustable reflector 24 in FIGS. 1 and 3 or the 3D-adjustable reflector 26 in FIG. 3 respectively reflects the two light signals irradiating onto the second 2D-adjustable reflector 24 or the 3D-adjustable reflector 26 to the fixation reflector 28 or directly to the pixel in space. For example, when the pixel depth of the pixel data of a pixel of the 3D image is 150 mm, the corresponding depth of field 150 mm in the lookup table can be identified first and then mapped to the reflection angles $\theta_1$ and $\theta_2$ of the two light signals reflected by the second 2D-adjustable reflector 24 or the 3D-adjustable reflector 26, which are 67° and 72° respectively.

Figure 9:
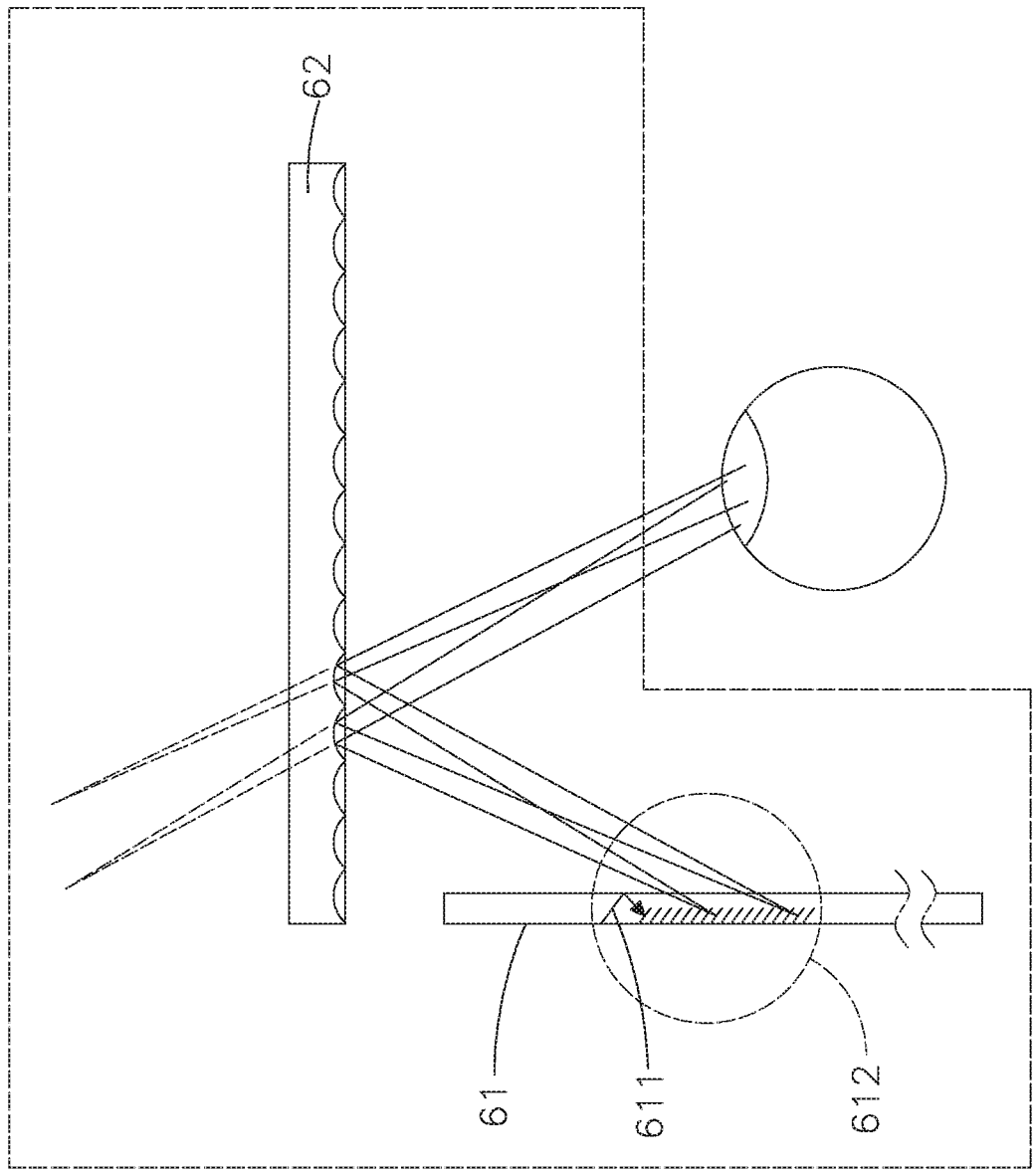
FIG. 9 is schematic diagram showing a system in accordance with the present invention applied to augmented reality (AR) glasses.

As far as the relevant applications are concerned, with reference to FIG. 9, an augmented reality (AR) spectacle which includes a frame 61 and a lens set 62 is shown. The system for displaying a 3D image with depths in accordance with the present invention includes a light signal generator 611 and a reflector set 612. The reflector set 612 has two 2D-adjusatable reflectors. Owing to its tiny size, the system can be installed inside the frame 61. In one embodiment, the light signal generator 611 includes but is not limited to a laser light source or a low pixel-resolution matrix light source, the lens set 62 includes multiple plano lenses or multiple reflex mirror lenses, and the two 2D-adjustable reflectors of the reflector set 612 are biaxial MEMS mirrors. In the present embodiment, when sequentially generated by the light signal generator 611, the multiple light signals are reflected by the reflector set 612 to project two sequential light signals onto one of the Fresnel reflective surfaces of the AR spectacle to form a pixel of a 3D image in space to the viewer's eye. Such design can enlarge the field of view (FOV) of the user for displaying 3D images with desired depths.

Figure 10:
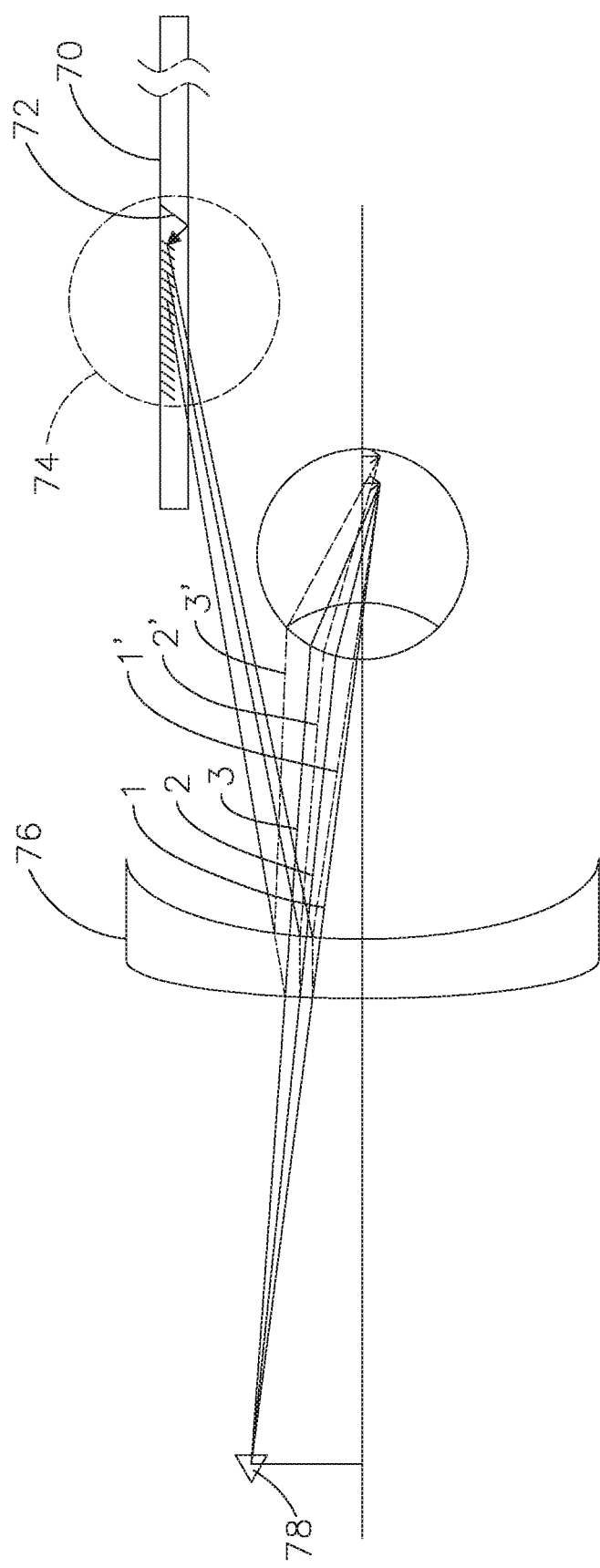
FIG. 10 is a schematic diagram showing a system in accordance with the present invention applied to AR glasses that can fix near-sighted problem.

With reference to FIG. 10, one more application of incorporating the system for displaying a 3D image with depths into AR spectacle that can fix near-sighted problem is shown. The AR spectacle include a frame 70 and a lens 76. The system for displaying a 3D image with depth includes a light signal generator 72 and a reflector set 74. The reflector set 74 includes two 2D-adjustable reflectors. The AR spectacle is structurally similar to those in FIG. 9 except that the lens 76 is a planto lens or a reflex mirror made of plastic or glass. When the multiple light signals sequentially generated by the light signal generator 72 are reflected by the reflector set 74 to project two sequential light signals onto the lens 76 of the AR spectacle, those light signals reflected by the lens 76 to visualize the object 78 on the retina of the viewer's eye. The AR spectacle of the present embodiment is designed for users with near-sighted issue. To correct the near-sighted issue, the AR spectacle can be tailored to suit for user's eyeglass prescription by using the lens 76 with the right reflection angle to properly reflect light signals irradiating thereon to the retina of the user. The dash lines indicated by 1', 2' and 3' are directed to a 3D image with vision correction, which is formed on the retina of the viewer, while the solid lines indicated by 1, 2 and 3 are directed to the 3D image without vision correction, which is formed before the retina of the viewer.

Figure 11:
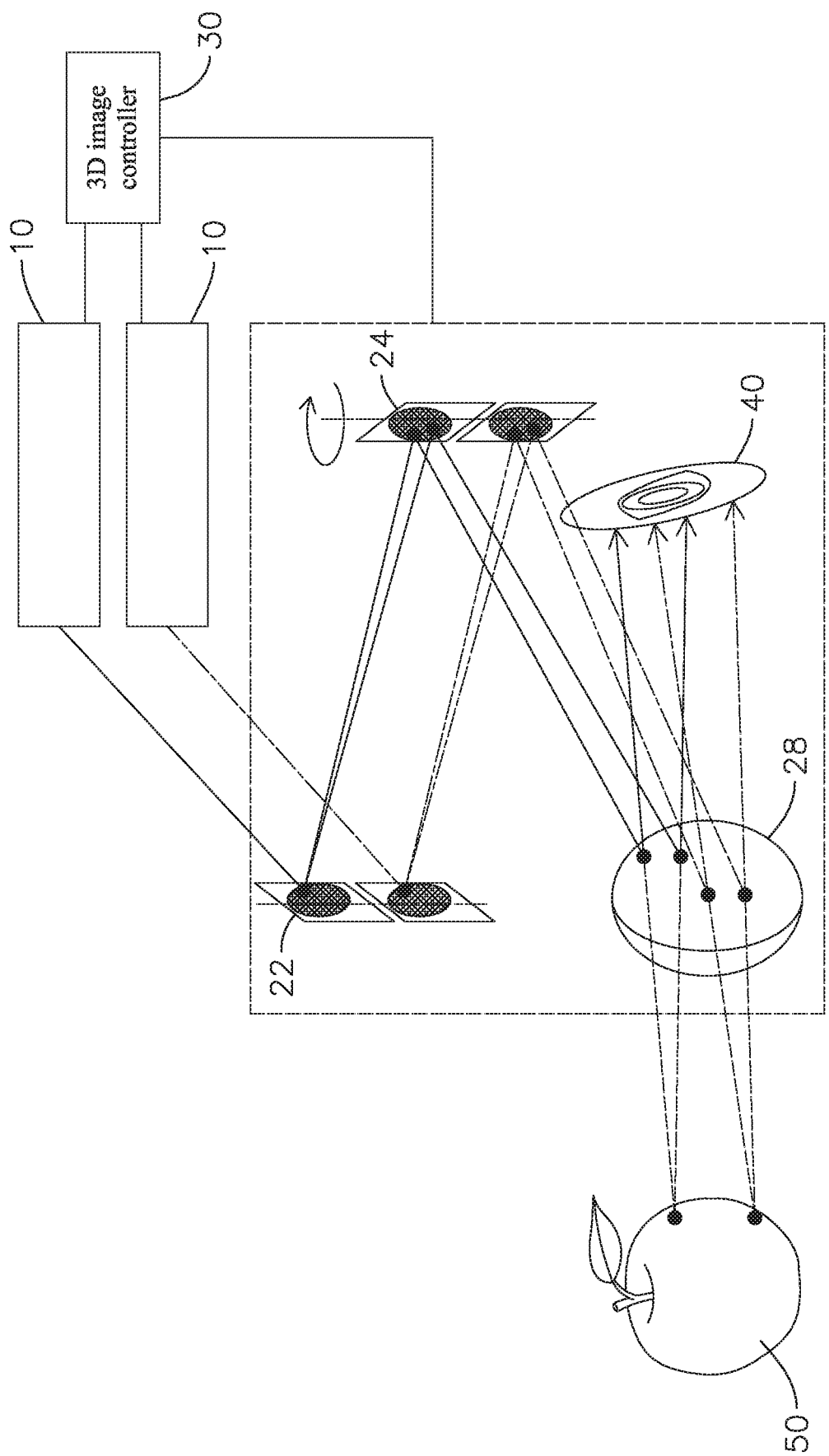
FIG. 11 is a schematic diagram showing a system having two light signal generators and two optical assemblies in accordance with the present invention.

With reference to FIG. 11, to be more scanning-efficient, the system for displaying a 3D image with depths includes two light signal generators 10 and two optical assemblies 20. The two light signal generators 10 alternately generate multiple light signals. The two optical assemblies alternately receive corresponding light signals from the two light signal generators, and project and scan the multiple light signals within a predetermined time period based on a predetermined scanning pattern to display the 3D image in space. The predetermined scanning pattern may be but not limited to one half of the 3D image jointly scanned by one of the light signal generators 10 and one of the optical assemblies 20 one row of the 3D image at a time in a left-to-right and top-down direction and the other half of the 3D image scanned by the other light signal generator 10 and the other optical assembly 20 one row of the 3D image at a time in a left-to-right and bottom-up direction. Each pixel of the 3D image is displayed at a position by at least two of the multiple light signals from one of the two light signal generators 10 to a viewer's eye 40, paths or extensions of the paths of the at least two light signals intersect at the position and at an angle associated with a depth of the pixel, and the predetermined time period is one eighteenth of a second.

Figure 12:
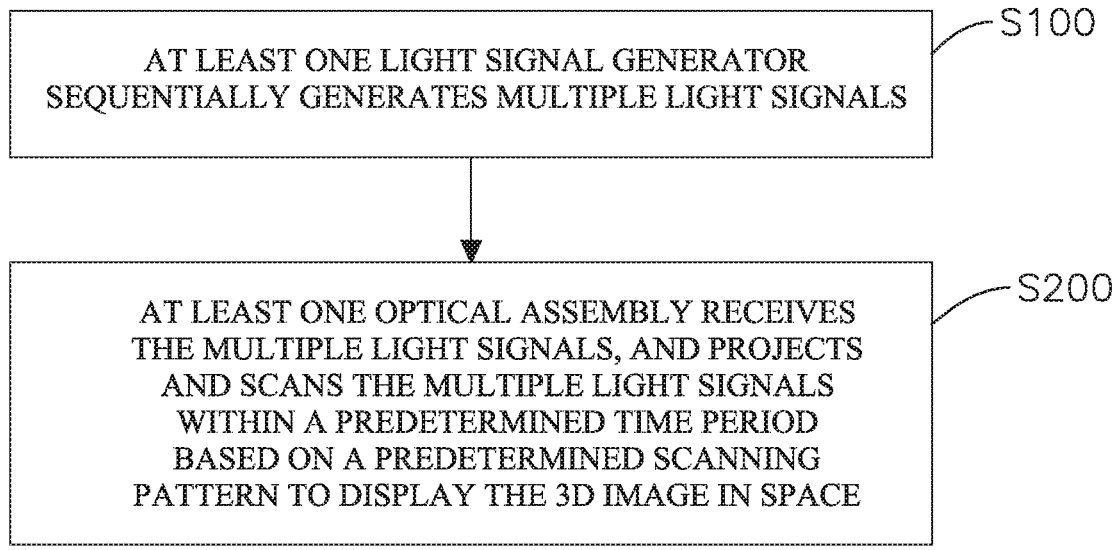
FIG. 12 is a flow diagram showing a method for displaying a 3D image with depth in accordance with the present invention.

With reference to FIG. 12, a method for displaying a 3D image with depths is performed by the foregoing system and includes the following steps.

Step 100: At least one light signal generator sequentially generates multiple light signals.

Step 200: At least one optical assembly receives the multiple light signals, and projects and scans the multiple light signals within a predetermined time period based on a predetermined scanning pattern to display the 3D image in space.

Each pixel of the 3D image is displayed at a position by at least two of the multiple light signals to a viewer's eye, paths or extensions of the paths of the at least two light signals intersects at the position and at an angle associated with a depth of the pixel, and the predetermined time period is one eighteenth of a second.

It will be apparent to those skilled in the art that various modification and variations can be made in the digital property management method and related apparatus of the present invention without departing from the spirit or scope of the invention. Thus, it is intended that the present invention cover modifications and variations that come within the scope of the appended claims and their equivalents.

What is claimed is:

1. A system for displaying a 3D image with depths comprising:
   at least one light signal generator sequentially generating multiple light signals;
   at least one optical assembly receiving the multiple light signals from the at least one light signal generator, and projecting and scanning the multiple light signals within a predetermined time period based on a predetermined scanning pattern to display the 3D image in space; and
   wherein each pixel of the 3D image is displayed at a position by at least two of the multiple light signals to a viewer's eye, paths or extensions of the paths of the at least two light signals intersect at the position and at an angle associated with a depth of the pixel, and the predetermined time period is one eighteenth of a second.

2. The system of the claim 1, wherein the at least one light signal generator has one light signal generator and the at least one optical assembly has one optical assembly.

3. The system of claim 2 further comprising:
   a 3D image controller adapted to receive multiple pixel data of the 3D image and the predetermined scanning pattern from a 3D image creator, and then respectively providing light signal generating control data to the at least one light signal generator and providing optical assembly control data to the optical assembly; and
   wherein each pixel data comprises a pixel light color, a pixel light intensity, a pixel location, a pixel depth, and a pixel generation frequency, the light signal generator generates the multiple light signals based on the light signal generating control data, the optical assembly projects and scans the multiple light signals based on the optical assembly control data.

4. The system of claim 3, wherein the 3D image controller contains a lookup table for converting the pixel location and the pixel depth of each pixel of the 3D image to the optical assembly control data.

5. The system of claim 3, wherein the optical assembly comprises a first biaxial MEMS mirror to reflect the multiple light signals from the light signal generator, a second biaxial MEMS mirror to reflect the multiple light signals from the first biaxial MEMS mirror, and a fixed reflector to reflect the multiple light signals from the second biaxial MEMS mirror to the viewer's eye.

6. The system of claim 5, wherein the 3D image controller, by using a lookup table, converts the pixel location and pixel depth of each pixel of the 3D image to first mirror control signals and second mirror control signals for the first biaxial MEMS mirror and the second biaxial MEMS mirror to project the multiple light signals to display each pixel with the first mirror control signals and the second mirror control signals respectively.

7. The system of claim 2, wherein each pixel of the 3D image is displayed by only two light signals.

8. The system of claim 2, wherein each of the multiple light signals displaying a same pixel of the 3D image contains a mixed color of red, green, and blue identical in colorfulness.

9. The system of claim 2, wherein the multiple light signals include two light signals displaying a same pixel of the 3D image and containing two complimentary light colors.

10. The system of claim 9, wherein the two light signals displaying the same pixel of the 3D image respectively contain two colors selected from red and cyan, green and magenta, or blue and yellow.

11. The system of claim 2, wherein the multiple light signals include three light signals displaying a same pixel of the 3D image and containing three colors respectively selected from red, green, and blue.

12. The system of claim 2, wherein the light signal generator consecutively generates the multiple light signals displaying a same pixel.

13. The system of claim 2, wherein the light signal generator comprises a light source, a color modifier, and a reflector.

14. The system of claim 13, wherein the light source comprises laser, light-emitting diode (LED), micro LED, organic LED (OLED), superluminescent diode (SLD) or any combination thereof.

15. The system of claim 13, wherein the light source comprises one red light laser source, one green light laser source, and one blue light laser source.

16. The system of claim 2, wherein the optical assembly comprises a 3D-adjustable reflector to project and scan the multiple light signals to the viewer's eye.

17. The system of claim 16, wherein the 3D-adjustable reflector is a triaxial MEMS mirror.

18. The system of claim 2, wherein the optical assembly comprises a first 2D-adjustable reflector to reflect the multiple light signals from the light signal generator and a second 2D-adjustable reflector to reflect the multiple light signals from the first 2D-adjustable reflector, and a fixed reflector to reflect the multiple light signals from the second 2D-adjustable reflector to the viewer's eye.

19. The system of claim 18, where the one optical assembly comprises a first biaxial micro-electromechanical system (MEMS) mirror, liquid crystal on silicon (LCOS), or digital light processing (DLP) to reflect the multiple light signals from the light signal generator and a second biaxial MEMS mirror, LCOS, or DLP to reflect the multiple light signals from the first biaxial MEMS mirror, LCOS, or DLP to the viewer's eye.

20. The system of claim 18, wherein the fixed reflector comprises flat mirror, Fresnel lens, Frensel reflector, curved mirror, diopter lens, periodic nanostructure photopolymer film, Bragg grating waveguide, or any combination thereof.

21. The system of claim 1, wherein the 3D image is a real image or a virtual image.

22. A method for displaying a 3D image with depths comprising:
    (a) at least one light signal generator sequentially generating multiple light signals; and
    (b) at least one optical assembly receiving the multiple light signals, and projecting and scanning the multiple light signals within a predetermined time period based on a predetermined scanning pattern to display the 3D image in space;
    wherein each pixel of the 3D image is displayed at a position by at least two of the multiple light signals to a viewer's eye, paths or extensions of the paths of the at least two light signals intersect at the position and at an angle associated with a depth of the pixel, and the predetermined time period is one eighteenth of a second.

23. The method of claim 22, wherein each pixel of the 3D image is displayed by only two light signals.

24. The method of claim 22, wherein each of the multiple light signals displaying a same pixel of the 3D image contains a mixed color of red, green, and blue identical in colorfulness.

25. The method of claim 22, wherein the multiple light signals include two light signals displaying a same pixel of the 3D image and containing two complimentary light colors.

26. The method of claim 25, wherein the two light signals displaying the same pixel of the 3D image respectively contain two colors selected from red and cyan, green and magenta, or blue and yellow.

27. The method of claim 22, wherein the multiple light signals include three light signals displaying a same pixel of the 3D image and containing three colors respectively selected from red, green, and blue light colors.

28. The method of claim 22, wherein the predetermined scanning pattern is to scan the pixels of the 3D image
    (1) from left to right, and from top to bottom or bottom to top;
    (2) from concentrically located rings in the 3D image in a direction from an innermost ring to an outermost ring or from the outermost ring to the innermost ring;
    (3) spirally from a boundary region to a center of the 3D image, or from the center to the boundary region;
    (4) from the closest pixels (to viewer) to farthest pixels, or from farthest pixels to closest pixels;
    (5) radially through all pixels between a center and a pixel on a boundary region in a direction sequentially shifting from 0 degree to 360 degrees;
    (6) in a zigzag manner traversing all pixels of the 3D image from a top left corner to a bottom right color; or
    (7) randomly for special effects.

29. The method of claim 22, wherein the 3D image is a real image or a virtual image.

* * * * *